United States Patent [19]

O'Farrell

[11] Patent Number: 4,569,465

[45] Date of Patent: Feb. 11, 1986

[54] STEREO SPORT BELT

[76] Inventor: George T. O'Farrell, 7263 SW. Capitol Hill Rd., Portland, Oreg. 97219

[21] Appl. No.: 669,095

[22] Filed: Nov. 7, 1984

[51] Int. Cl.$^4$ .............................................. A45F 3/00
[52] U.S. Cl. .................................. 224/224; 224/229; 224/251
[58] Field of Search ............... 224/224, 227, 229, 251, 224/904

[56] References Cited

U.S. PATENT DOCUMENTS 4,133,604 1/1979 Fuller .................................. 351/123
4,416,404 11/1983 Daniels ................................ 224/224

Primary Examiner—Stephen Marcus
Assistant Examiner—David Voorhees
Attorney, Agent, or Firm—Chernoff, Vilhauer, McClung, Birdwell & Stenzel

[57] ABSTRACT

An exercise belt adapted to carry a stereo unit comfortably and stably on the wearer's body during vigorous exercise includes a pair of neoprene bands partially overlapped and joined together at the overlap so as to form a symmetrical belt having an elongate open-ended sleeve in the middle. Velco fastening strips on the outer ends of the bands allow the tension in the belt to be adjusted. The resilient neoprene allows the open ends of the sleeve and the sleeve itself to resiliently deform to receive and retain a stereo unit. When the belt is strapped around the waist of an athlete, the bands and integral sleeve stretch longitudinally, constricting the sleeve to fix the stereo unit within the sleeve and holding the stereo unit snugly to the wearer's body. The neoprene material protects the stereo unit from moisture, from impact, and cushions the athlete from the stereo unit.

17 Claims, 5 Drawing Figures

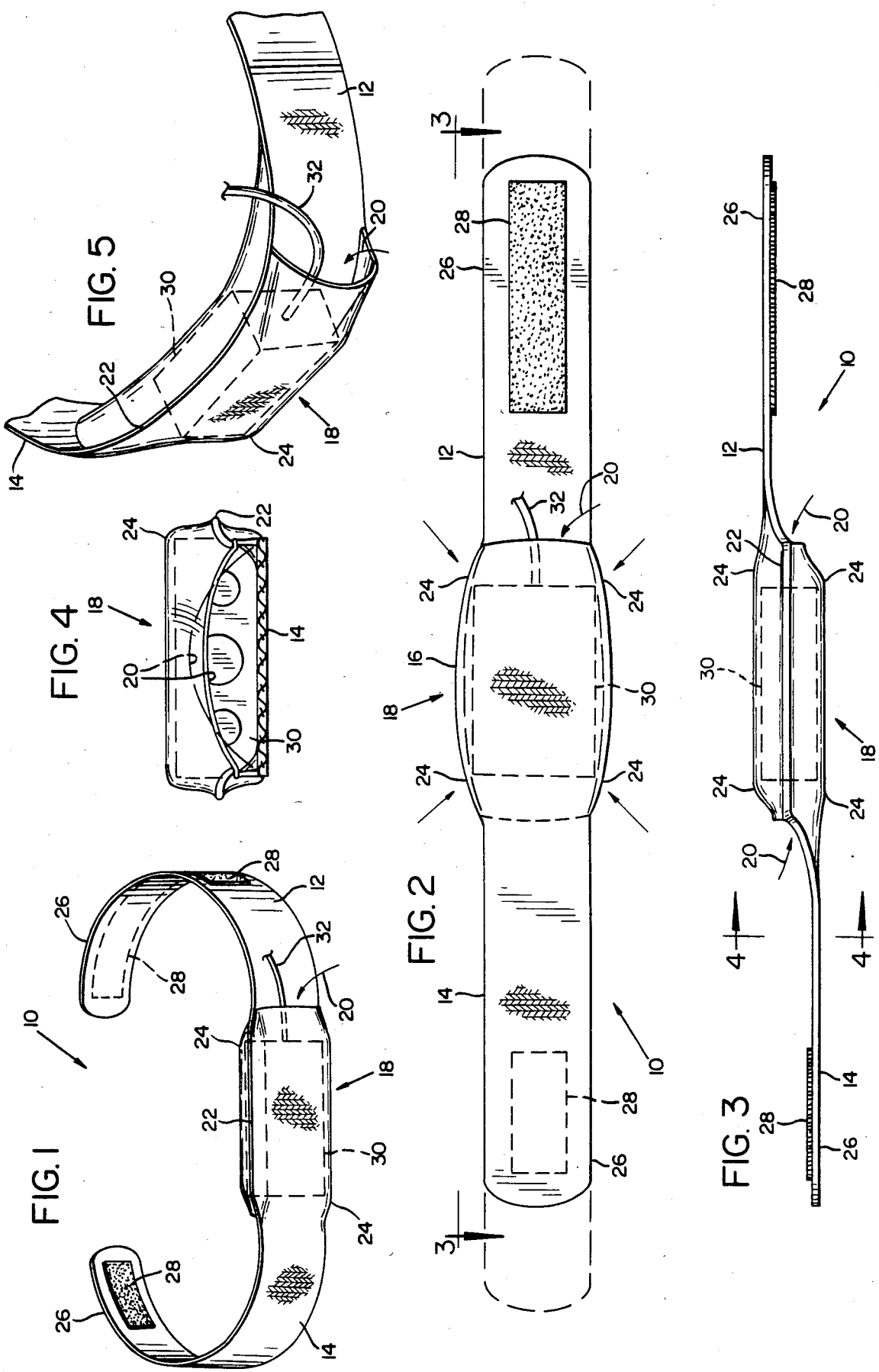

STEREO SPORT BELT

BACKGROUND OF THE INVENTION

This invention relates to exercise belts and particularly to such belts adapted to comfortably and securely carry a portable stereo unit such as a tape deck or radio during the conduct of vigorous exercise.

Recent developments in the area of lightweight portable stereo equipment such as tape decks, radios and earphones have created a demand for an apparatus to conveniently carry these devices during active pursuits including exercise and athletic endeavors. A well known example of such a stereo unit is the popular Sony Walkman ®. Many people have found that it is pleasurable to listen to music or educational tapes while skiing, skating, walking or engaging in other active pursuits. Monotonous aerobic exercises such as running or cycling are particularly suitable for musical accompaniment.

While a stereo unit may be carried by hand, this approach restricts the activities which may be engaged in by the listener and can be tiring and uncomfortable. Attaching the stereo unit to the listener's body by a belt or harness is preferable. However, the problem then becomes how to stabilize the stereo unit on the body during vigorous exercises so that the stereo unit does not appreciably move in relation to the body. Such "bouncing" of the stereo unit is distracting and uncomfortable. Other considerations attendant to carrying the stereo unit on the body during activities include interference with bodily movement, comfort, and protection of the stereo unit from moisture, heat and impact.

It will be appreciated that although it is possible to strap or wrap a stereo unit so tightly to the body so as to prevent relative movement between the stereo unit and the body, such a tight strapping would be unduly restrictive of the body's movement during athletic endeavors and quite uncomfortable. At the other extreme, merely clipping the stereo unit to a belt or clothing allows the unit to flop around even during moderate exercise. Among the attempted solutions to this problem is a belt which provides a cradle of intersecting elastic members to hold the stereo unit onto the belt, which is wrapped around the waist of the athlete. While such an arrangement is preferable to merely clipping the stereo unit on the belt, it does not eliminate the movement of the stereo unit relative to the body. Nor does such an arrangement cushion the stereo unit from the body or from other objects, or protect the stereo unit from moisture, either from the athlete's perspiration or from the elements.

SUMMARY OF THE INVENTION

The present invention addresses many of the aforementioned problems by providing a belt for securely carrying a portable stereo unit during vigorous exercises in such a fashion so as to minimize the relative movement of the stereo unit with respect to the wearer while maintaining the comfort and freedom of movement of the wearer. The belt of the present invention also protects the stereo unit from the weather, the athlete's perspiration, knocks against external objects, and provides adequate ventilation to the stereo unit. In addition to the functional aspects set forth above, the novel design of the belt of the present invention contributes to an easy and inexpensive manufacturing process, is comfortable to wear, and has a very pleasing appearance.

A pair of elongate flexible bands of elastomeric closed-cell foam such as neoprene are partially overlapped and joined together at the longitudinal edges of the overlap to create an elongate open-ended sleeve which is integral with the bands. The sleeve is slightly wider than the remainder of the bands so that the openings to the sleeve have a smaller inner circumference than does the sleeve. The elastomeric material of the neoprene enables the openings and the sleeve to resiliently deform to receive and retain a stereo unit therein. The ends of the bands remote from the sleeve include mating velcro fastener elements to fasten the belt about the waist of an athlete. When the belt is worn, the wide bands and wider sleeve stretch in a longitudinal direction substantially evenly throughout the belt. This longitudinal stretching acts to constrict circumference of the sleeve and grip the stereo unit.

The overlapping bands provide an opening to the sleeve on both sides of the belt, and this feature, coupled with the use of velcro fasteners render the belt completely reversible. The neoprene material cushions the wearer from the stereo unit and the stereo unit from knocks against other objects. The waterproof neoprene also protects the stereo unit from moisture while allowing ventilation through the exposed opening.

Accordingly it is a principal object of the present invention to provide a belt for securely and stably carrying a stereo unit during vigorous exercise.

It is a further object of the present invention to provide such a belt which stretches to securely grip the stereo unit and distribute the support of the unit throughout the belt.

It is a further object of the present invention to provide such a belt which cushions the user from the stereo unit and cushions the stereo unit from knocking against other objects.

It is a further object of the present invention to provide such a belt which protects the stereo unit from moisture.

It is a further object of the present invention to provide such a belt which allows air circulation to the stereo unit.

It is a further object of the present invention to provide such a belt which is reversible.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a perspective view of the preferred embodiment of the present invention.

FIG. 2 is a plan view of the belt of FIG. 1 showing the stretched configuration in dashed lines.

FIG. 3 is an elevational view of the belt of FIG. 2 from the reference lines 3—3.

FIG. 4 is a cross-sectional view of the belt of FIG. 3 taken along the lines 4—4.

FIG. 5 is a partial perspective view of the belt of FIGS. 1-4 as it would be worn by an athlete.

DETAILED DESCRIPTION OF THE INVENTION

As shown in FIGS. 1-3, the preferred embodiment of the stereo sports belt 10 includes a first elongate flexible band 12 of elastic material and a second elongate band 14 of elastic material substantially identical to the first band. Each of the bands includes an elongate head 16 slightly wider than the remainder of the band at one end thereof, the heads of the respective bands being overlapped and fastened together at their respective upper and lower edges so as to form an elongate sleeve 18 having openings 20 at either end and an upper and lower longitudinal seam 22 where the bands are fastened together. The heads may be sewn together or bonded together to form the sleeve in any appropriate manner. Since the respective heads 16 taper to the width of the respective bands 12 and 14 at both ends of the elongate heads, the sleeve formed from the heads includes shoulders 24 where such tapered portions are fastened together. As a result it will be understood that the inner circumference of the sleeve 18 is larger than the circumference of the openings 20. The respective outer ends 26 of each band each include a fastener element 28 which cooperates with the fastener element 28 of the other band.

As set forth above, each of the bands are of an elastic material, preferably a unitary piece of elastomeric foam material such as neoprene. In particular, the sleeve 18 must be made of an elastic material which will resiliently deform to receive and retain a stereo unit 30 such as a tape deck or radio having a circumferential dimension greater than the inner circumference of the opening 20 as may be seen in FIG. 4. It is preferable that the relaxed inner circumference of the sleeve also be slightly smaller than the circumferential dimension of the stereo unit. A common feature of elastic material is that its dimensions typically change when it is stretched. This is particularly important in the present invention in that as the sleeve 18 is stretched in a lengthwise direction, the width of the sleeve 18, and therefore its inner circumference are reduced, gripping the stereo unit. Construction of the bands from a unitary piece of elastic material enhances this gripping effect by uniformly transmitting the longitudinal stretch of the bands to the sleeve.

The neoprene material has this desired elastic characteristic and also has several other highly desirable characteristics. The foam-like material acts to cushion the body from the stereo unit and also cushions the stereo unit from knocking and bumping against external objects. The neoprene is waterproof, thus protecting the stereo unit from the perspiration of the athlete and from rain or snow. Finally, the neoprene material is typically covered with a nylon material which is attractive, stain resistant, washable, and comfortable against the wearer's skin.

The aforementioned gripping effect may be seen in FIG. 2. In a relaxed, non-tensioned configuration shown in solid lines, the elastomeric quality of the neoprene is sufficient to allow either opening 20 stretch to receive the stereo unit 30 and retain it within the sleeve 18. When the belt is stretched to the position shown in dashed lines, the whole belt, including the sleeve, tends to elongate and reduce its dimension perpendicular to the direction of the stretch. As shown in FIG. 2, this has the effect of tightly gripping the stereo unit and securely fixing its position within the sleeve. In particular, such stretching of the belt causes the shoulders 24 to press inwardly on the stereo unit securely positioning the stereo unit within the sleeve as indicated by the arrows of FIG. 2, so that not only will the stereo unit not fall out of the sleeve through the opening, but it will not change position within the sleeve while the belt is under tension.

Such stretching also causing the opening 20 to decrease in circumference and pucker as shown in dashed lines in FIG. 4, further ensuring that the stereo unit will not fall out of the sleeve. This property of the elastic material allows the tape deck to be securely carried in the sleeve without need for a closure and allows air to circulate to the stereo unit to ensure that the various electronic parts do not overheat and malfunction. The puckering of the opening when the material is stretched facilitates air circulation by changing the shape of the opening from a slit to an elipsoid. It should also be noted that the neoprene also serves to insulate the tape deck from the heat given off by the athlete's body during vigorous exercise.

In operation, a stereo unit 30 is inserted through one of the openings 20 into the sleeve 18 with the earphone cord 32 extending out the opening. The belt is positioned about the user's waist so that the sleeve and stereo unit are positioned at the small of the back and the attachment elements 28, such as mating velcro fabric, are engaged. The tension of the belt may be adjusted by the relative engagement of the elongate Velcro strips so that the belt is comfortable and the stereo unit is held snugly and stably in the small of the back, the tension in the belt contributes to the stabilizing effect described above. The wide elastic bands and sleeve distribute the tension and the weight of the stereo unit substantially evenly around the waist of the wearer. The wide neoprene belt also warms the wearer and supports the small of his back in a manner well known in the field of exercise belts.

FIG. 5 shows the belt of the present invention having a stereo unit within the sleeve as it would appear when worn by an athlete during exercise. The tension caused by the band being stretched around the waist of the athlete causes the sleeve to stretch and grip the stereo, the shape of the sleeve, including the shoulders 24, cooperating to immobilize the stereo within the sleeve. The construction of the bands from a unitary piece of neoprene material securely positions the stereo against the small of the back and prevents movement between the belt and the athlete's body and between the stereo unit and the belt. In the preferred embodiment the nylon fabric backing on the neoprene assist in this regard. It will be understood that even very vigorous exercise will not cause the belt or stereo to respectively shift position or bounce.

As may be seen in FIG. 3, the use of velcro fasteners 28 allows the belt to be used in a reversible manner. Construction of the belt so that it has an opening 20 exposed on either side also allows the belt to be used in a reversible manner. Neoprene such as used in wet suits typically has a fabric bonded to both sides of the plastic foam. It is usually available with a different color on each side of the neoprene material. Using such material, the preferred embodiment of the invention is constructed so that the two bands which constitute the belt have a single color of material exposed on each side of the belt. Thus, the reversible nature of the belt allows the user to choose between the two colors each time the belt is used.

It should be noted that in addition to the functional attributes discussed above, the belt of the present invention has a pleasing appearance and is economical to manufacture. The construction of the belt from two substantially identical bands contributes to both of these features. In manufacturing a single pattern may be used to cut the belt material and the two seams required to connect the bands together are straightforward and identical. When worn by an athlete, the belt includes only a single opening to disturb the continuous run of material around the waist.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A belt for carrying a stereo unit such as a tape deck or radio during sports or other physical activity comprising:
   (a) a first elongate band;
   (b) a second elongate band, said first and second bands respectively having inner and outer ends, said inner ends of said bands arranged so as to form an overlap and joined together at said overlap so as to form an elongate sleeve between said inner ends of said bands; and
   (c) each of said bands including elastic material constituting means for resiliently deforming to receive and retain said stereo unit within said sleeve.

2. The belt of claim 1 wherein said sleeve includes means for circumferentially constricting and gripping said stereo unit when one of said bands is urged in the opposite direction of the other one of said bands.

3. The belt of claim 1 wherein said sleeve includes openings at either end, said sleeve narrowing at either end to said openings.

4. The belt of claim 1 wherein said bands are substantially identical.

5. The belt of claim 1 wherein each of said bands include a unitary piece of elastic material.

6. The belt of claim 1 wherein said bands include an elastomeric foam material.

7. The belt of claim 1 wherein said respective inner ends of said bands which are joined together to form said sleeve have a greater width than the remainder of said respective bands.

8. The belt of claim 1 including waterproof material throughout said bands.

9. The belt of claim 1 wherein the respective outer ends of said bands include mating attachment means for fastening said respective outer ends together.

10. The belt of claim 1 wherein said sleeve includes a spongy material constituting means for cushioning said stereo and from the wearer's body or from other external objects.

11. The belt of claim 1 including means for permitting said belt to be reversible.

12. The belt of claim 1 wherein each of said bands is integral with one of said panels comprising said sleeve.

13. The belt of claim 1 wherein said elastic material constitutes means for permitting said belt to stretch substantially evenly throughout the length of said belt.

14. A belt for carrying a stereo unit such as a tape deck or radio during sports or other physical activity comprising:
   (a) a first elongate flexible band;
   (b) a second elongate flexible band, said bands respectively having inner and outer ends;
   (c) an elongate open sleeve interposed between and interconnecting said respective inner ends of said bands, said sleeve including two elongate panels joined together so as to form said sleeve therebetween, each of said panels connected to one of said respective inner ends of said bands;
   (d) said sleeve including an elastic material constituting means for resiliently deforming to receive and retain said stereo unit within said sleeve and said elastic material also constituting constriction means for gripping said stereo unit when said sleeve is stretched along its longitudinal axis.

15. The belt of claim 14 wherein said elongate sleeve includes openings at either end thereof, said sleeve including gripping means for decreasing the circumference of said sleeve and the size of said openings when said sleeve is stretched in a length-wise direction.

16. The belt of claim 14 wherein said sleeve narrows to said openings, said opening having a smaller circumference than said sleeve.

17. A belt for carrying a stereo unit such as a tape deck or radio during sports or other physical activity comprising:
   (a) an elongate tubular sleeve having two open ends and having a front side substantially opposed to a back side;
   (b) first and second elongate flexible bands, said bands respectively having inner and outer ends;
   (c) said sleeve interposed between and interconnecting said bands, said inner end of said first band attached to said front side of said sleeve proximate one of said open ends and said inner end of said second band attached to said back side of said sleeve proximate the other one of said open ends; and
   (d) said sleeve including an elastic material constituting means for resiliently deforming to receive and retain said stereo unit within said sleeve, said elastic material also constituting constriction means for decreasing the circumference of said tubular sleeve and gripping said stereo unit when said sleeve is stretched along its longitudinal axis.

* * * * *